US012622449B2

(12) United States Patent
Ito et al.

(10) Patent No.: US 12,622,449 B2
(45) Date of Patent: May 12, 2026

(54) METHOD FOR PRODUCING SWEETENER

(71) Applicant: Kikkoman Corporation, Noda (JP)

(72) Inventors: Yusuke Ito, Noda (JP); Izumi Kobayashi, Noda (JP); Hikari Mori, Noda (JP); Takeharu Nakahara, Noda (JP); Yoko Iijima, Atsugi (JP)

(73) Assignee: KIKKOMAN CORPORATION, Noda (JP)

( * ) Notice: Subject to any disclaimer, the term of this patent is extended or adjusted under 35 U.S.C. 154(b) by 182 days.

(21) Appl. No.: 18/279,728

(22) PCT Filed: Feb. 25, 2022

(86) PCT No.: PCT/JP2022/007883
§ 371 (c)(1),
(2) Date: Aug. 31, 2023

(87) PCT Pub. No.: WO2022/186071
PCT Pub. Date: Sep. 9, 2022

(65) Prior Publication Data
US 2024/0306686 A1     Sep. 19, 2024

(30) Foreign Application Priority Data
Mar. 2, 2021     (JP) ................................. 2021-032346

(51) Int. Cl.
*A23L 27/30*          (2016.01)
(52) U.S. Cl.
CPC ............... *A23L 27/33* (2016.08); *A23L 27/31* (2016.08)
(58) Field of Classification Search
CPC .................................. A23L 27/31; A23L 27/33
See application file for complete search history.

(56) References Cited

FOREIGN PATENT DOCUMENTS

| | | |
|---|---|---|
| JP | H01-181785 A | 7/1989 |
| JP | 2003-047455 A | 2/2003 |
| JP | 2008-283886 A | 11/2008 |
| JP | 2017-012126 A | 1/2017 |
| JP | 6243475 B2 | 12/2017 |
| JP | 2019-176825 A | 10/2019 |
| WO | WO-2006041469 A1 * | 4/2006 ............. A21D 2/145 |
| WO | 2022/018963 A1 | 1/2022 |

OTHER PUBLICATIONS

Machine translation of JP2019176825. Publication date Oct. 17, 2019, pp. 1-8. (Year: 2019).*
Kaneko, "Prototype of a new sweet material made from colored rice," Bulletin of the Akita Research Institute of Food and Brewing, 13: 24-30 (2011).
International Search Report issued in corresponding International Patent Application No. PCT/JP2022/007883 dated May 10, 2022.
International Preliminary Report on Patentability and Written Opinion issued in corresponding International Patent Application No. PCT/JP2022/007883 dated Sep. 14, 2023.
Akita et al., "Making of Saccharified Solution Used for Fermentation Following after Saccharification (Studies on the Brewing of Alcholic Beverage by the System of Fermentation Following after Saccharification (Part 1))", J. Brew. Soc. Japan. vol. 81, No. 6, 1986, pp. 396-401.

* cited by examiner

*Primary Examiner* — Jenna A Watts
(74) *Attorney, Agent, or Firm* — Morgan, Lewis & Bockius LLP

(57) ABSTRACT

Provided is a manufacturing method for a sweetener, the manufacturing method including: a saccharification step of injecting steam at a temperature of 90° C. or higher and 150° C. or lower into a mixture of water, rice flour, and an enzyme agent to cause the mixture to react and obtaining a saccharified liquid; a decomposition step of adding rice koji to the saccharified liquid and causing the mixture of the rice koji and the saccharified liquid to react at a temperature of 50° C. or higher and 80° C. or lower to obtain a fermenting mash; a heat treatment step of heating the fermenting mash at a temperature of 100° C. or higher; and a solid-liquid separation step of subjecting the heat-treated fermenting mash to solid-liquid separation.

10 Claims, No Drawings

METHOD FOR PRODUCING SWEETENER

TECHNICAL FIELD

The present invention relates to a manufacturing method for a sweetener.

BACKGROUND ART

Mirin is a type of sweetener produced from rice as an ingredient material and is widely used in food cooking. However, since mirin contains approximately 14% of alcohol, it is difficult for people who are sensitive to alcohol, minors, and people who are religiously prohibited from drinking alcohol to use it, and utilization of mirin as a sweetener may be restricted.

On the other hand, mirin-style sweet cooking seasonings in which microbial contamination can be suppressed while the alcohol content is reduced, are manufactured and sold as mirin substitutes, and these seasonings are produced by adding brewed vinegar and acidulants to sugars (liquid sugar and starch syrup). However, the mirin-style sweet cooking seasonings have a problem that they have a strong acid taste and lack the umami taste and richness inherent in mirin.

Apart from the mirin-style sweet cooking seasonings, amazake with a high sugar content produced from liquefied rice flour and rice koji as raw materials is described in Patent Literature 1 as an example of a non-alcoholic sweetener produced from rice as an ingredient material.

CITATION LIST

Patent Literature

Patent Literature 1: Japanese Unexamined Patent Publication No. 2019-176825

SUMMARY OF INVENTION

Technical Problem

However, the amazake described in Patent Literature 1 has a cloudy appearance as well as a unique unpleasant taste and rough deposits originating from rice koji, and in addition, the amazake is easily contaminated with microorganisms and does not keep for long, so it is difficult to use the amazake as a sweetener.

An object of the present invention is to provide a novel sweetener that is non-alcoholic yet with suppressed microbial contamination, has a mild acid taste, has strong umami taste and richness inherent in mirin, and has a clear appearance.

Solution to Problem

The present invention provides a manufacturing method for a sweetener, the manufacturing method including: a saccharification step of injecting steam at a temperature of 90° C. or higher and 150° C. or lower into a mixture of water, rice flour, and an enzyme agent to cause the mixture to react and obtaining a saccharified liquid; a decomposition step of adding rice koji to the saccharified liquid and causing the mixture of the rice koji and the saccharified liquid to react at a temperature of 50° C. or higher and 80° C. or lower to obtain a fermenting mash; a heat treatment step of heating the fermenting mash at a temperature of 100° C. or higher;

and a solid-liquid separation step of subjecting the heat-treated fermenting mash to solid-liquid separation.

According to the manufacturing method of the present invention, a sweetener that is non-alcoholic yet with suppressed microbial contamination and has a transparent appearance and the original taste of mirin, can be obtained. Furthermore, the sweetener obtained by the above-described manufacturing method has a rich sweet taste and a rich umami taste and has a mellow aroma. Incidentally, the sweetener obtained by the manufacturing method may have a Brix of 40% or more and may have a glucose concentration of 10% (w/v) or more. Furthermore, the sweetener obtained by the manufacturing method may have a pH of 5.5 or lower and may have a turbidity of 50 degrees or less. In addition, the sweetener obtained by the manufacturing method may have a citric acid concentration of 0.1% (w/v) or more.

The above-described manufacturing method may further include a concentration step of concentrating a liquid obtained in the solid-liquid separation step, under reduced pressure. As a result, the obtained sweetener has a richer sweet taste and a richer umami taste and has a more mellow aroma. Incidentally, the sweetener obtained through the concentration step may have a Brix of 55% or more and may have a glucose concentration of 20% (w/v) or more. Furthermore, the sweetener obtained through the concentration step may have a turbidity of 50 degrees or less. In addition, the sweetener obtained through the concentration step may have a glutamic acid concentration of 0.03% (w/v) or more, may have an alanine concentration of 0.025% (w/v) or more, and an arginine concentration of 0.085% (w/v) or more.

The present invention also provides a sweetener having a Brix of 55% or more, a turbidity of 50 degrees or less, a glucose concentration of 20% (w/v) or more, a glutamic acid concentration of 0.03% (w/v) or more, an alanine concentration of 0.025% (w/v) or more, and an arginine concentration of 0.085% (w/v) or more.

Advantageous Effects of Invention

According to the present invention, there is provided a novel sweetener that is non-alcoholic yet with suppressed microbial contamination, has a mild acid taste, has strong umami taste and richness inherent in mirin, and has a clear appearance.

DESCRIPTION OF EMBODIMENTS

Embodiments for carrying out the present invention will be described in detail below. However, the present invention is not intended to be limited to the following embodiments.

The term "sweetener" according to the present specification means a seasoning that imparts a sweet taste to food.

A manufacturing method for a sweetener according to the present embodiment includes: (1) a saccharification step of injecting steam into a mixture of water, rice flour, and an enzyme agent at a temperature of 90° C. or higher and 150° C. or lower to cause the mixture to react and obtaining a saccharified liquid; (2) a decomposition step of adding rice koji to the saccharified liquid and causing the mixture of the rice koji and the saccharified liquid to react at a temperature of 50° C. or higher and 80° C. or lower to obtain a fermenting mash; (3) a heat treatment step of heating the fermenting mash at a temperature of 100° C. or higher; and (4) a solid-liquid separation step of subjecting the heat-treated fermenting mash to solid-liquid separation.

(1) Saccharification Step

In the saccharification step, steam is injected into a mixture of water, rice flour, and an enzyme agent at a temperature of 90° C. or higher and 150° C. or lower to cause the mixture to react, and a saccharified liquid is obtained.

The rice flour used as a raw material in the saccharification step may be non-glutinous rice flour, glutinous rice flour, or a mixed flour thereof, and from the viewpoint of obtaining more inherent taste of mirin, non-glutinous rice flour is preferred. Furthermore, the rice flour may be polished rice flour, brown rice flour, or a mixed flour thereof, and the rice flour is preferably polished rice flour.

Examples of the enzyme agent used in the saccharification step include α-amylase, β-amylase, glucoamylase, glucosidase, glucose oxidase, glucose isomerase, cellulase, xylanase, pectinase, and protease. The enzyme agent used in the saccharification step can be added in amount of 0.001% by mass or more, and preferably 0.005% by mass or more, with respect to the rice flour.

Incidentally, before injecting steam into the mixture of water, rice flour, and an enzyme agent at a temperature of 90° C. or higher and 150° C. or lower, the mixture may be liquefied in advance at a temperature of 90° C. or lower. The temperature and time for this liquefaction can be appropriately adjusted according to the types and amounts of addition of the rice flour and enzyme agent used, and the like and can be set to, for example, 65° C. or higher and 85° C. or lower and 5 minutes or more and 60 minutes or less.

Regarding a method of injecting steam into a mixture (or a liquefied product thereof) of water, rice flour, and an enzyme agent at a temperature of 90° C. or higher and 150° C. or lower to cause the mixture to react, from the viewpoint that the amount of sugar can be increased, and coloration of the obtained liquefied liquid can be reduced, a method of injecting high-temperature steam into a mixture (or a liquefied product thereof) of water, rice flour, and an enzyme agent to instantaneously heat the mixture, stirring the mixture to become uniform, and decomposing starch contained in the mixture (or a liquefied product), is preferable. The saccharification reaction apparatus is not limited as long as it can carry out an enzymatic reaction for a material with high viscosity (about 450 cps or higher) at a desired temperature for a desired time, and examples include ROTA-THERM (registered trademark; manufactured by Gold Peg International Pty., Ltd.), KID's Cooker (registered trademark; manufactured by OKAWARA MFG. CO., LTD.), and a so-called jet cooker. Above all, it is preferable to use ROTATHERM because even in the case where the viscosity rises sharply in the course of liquefying, and liquid delivery by pumping becomes impossible in conventional methods, liquid delivery by pumping can be carried out by a suitable shear effect and the like. More specifically, the process can be carried out by the method described in Japanese Patent No. 6243475.

The temperature for the saccharification step is 90° C. or higher and 150° C. or lower; however, the temperature can be appropriately adjusted within the above-described range according to the injection amount of the mixture (or a liquefied product thereof) of rice flour and an enzyme agent, and the like. The time for the saccharification step can be appropriately adjusted according to the temperature, and for example, the time can be set to 1 minute or more and 3.5 minutes or less at 90° C. or higher and 150° C. or lower.

(2) Decomposition Step

The decomposition step is a step of adding rice koji to the saccharified liquid obtained in the saccharification step and causing the mixture of the rice koji and the saccharified liquid to react at a temperature of 50° C. or higher and 80° C. or lower to obtain a fermenting mash.

The form of the rice koji used in the decomposition step is not particularly limited, and a dried product, a refrigerated product, a frozen product, and the like can all be used. Furthermore, the type of the rice koji is not particularly limited, and for example, any of yellow koji, white koji, and black koji may be used, which can be used singly or as a mixture. Regarding the yellow koji, for example, rice koji using at least one selected from the group consisting of *Aspergillus oryzae, Aspergillus sojae,* and *Aspergillus tamarii* as koji mold can be employed. Regarding the white koji, for example, rice koji using *Aspergillus kawachii* and/or *Aspergillus usamii* mutant shirousamii as koji mold can be employed. Regarding the black koji, for example, rice koji using *Aspergillus niger* or *Aspergillus awamori* can be employed. Rice koji can be added in an amount of 5% to 95% by mass, and preferably 10% to 90% by mass, with respect to the rice flour.

In the decomposition step, an enzyme agent may be further added. As a result, the sugars, amino acids, aroma components, and the like produced by enzymatic decomposition of rice koji can make the sweet taste and umami taste of the sweetener obtained through the subsequent steps richer and can make the aroma more mellow. Examples of the enzyme agent used in the decomposition step include α-amylase, β-amylase, glucoamylase, glucosidase, glucose oxidase, glucose isomerase, cellulase, xylanase, pectinase, and protease. The enzyme agent used in the decomposition can be added in an amount of 0.005% by mass or more, and preferably 0.01% by mass or more, with respect to the rice flour.

In the decomposition step, an acidulant may be further added. As a result, the pH of the saccharified liquid is adjusted to be weakly acidic, and therefore, microbial contamination is further suppressed, while refreshingness and richness can be imparted by imparting an appropriate acid taste. It is desirable that the pH after adjustment by addition of the acidulant is set to 3.0 to 6.0, and preferably 3.5 to 5.5, from the viewpoints of antifungal properties and flavor. Examples of the acidulant to be used include lactic acid, citric acid, tartaric acid, malic acid, adipic acid, and gluconic acid.

It is preferable that the decomposition step is carried out in a tank in which the reaction temperature can be maintained constant, and the entirety of the reactants can be stirred. The temperature in the decomposition step is 50° C. or higher and 80° C. or lower; however, the temperature can be appropriately adjusted in the above-described range according to the amount of the saccharified liquid, the types and amounts of addition of the rice koji, enzyme agent, and acidulant, and the like. The time in the decomposition step can be appropriately adjusted according to the temperature, and for example, the time can be set to 12 hours or more and 36 hours or less at 50° C. or higher and 80° C. or lower.

(3) Heat Treatment Step

The heat treatment step is a step of heating the fermenting mash obtained in the decomposition step at a temperature of 100° C. or higher. By heat-treating the fermenting mash, the fermenting mash is sterilized, and the enzyme agent present in the fermenting mash is deactivated, while in addition, the removal of lees in the subsequent step becomes unnecessary.

The method for heat treatment in the heat treatment step is not particularly limited as long as the fermenting mash can be subjected to sterilization, and examples include methods such as steam injection, steam infusion, a jacketed tank, a surface scraping method, tube type heat exchange, and Joule type heat exchange. Among these heat treatment methods, from the viewpoint that rapid heating and cooling are enabled while thermal degradation can be suppressed to a minimal level, and from the viewpoint that stable sterilization can be continuously performed, and the throughput per unit time is large, a heat treatment by tube type heat exchange is preferable.

For example, in the case of tube type heat exchange, the temperature and time in the heat treatment step can be set to 105° C. or higher and 125° C. or lower for 10 seconds or more and 60 seconds or less.

(4) Solid-Liquid Separation Step

The solid-liquid separation step is a step of subjecting the heat-treated fermenting mash to solid liquid separation. The sweetener obtained in this step has a clear appearance and does not have the unique unpleasant taste and rough deposits originating from rice koji, and therefore, the sweetener can be easily used as a sweetener.

The method in the solid-liquid separation step is not limited, and for example, solid-liquid separation can be carried out by methods such as pressing and filtration by apparatuses such as a filter press.

The sweetener obtained through the solid-liquid separation step may have a Brix of 40% or more and may have a glucose concentration of 10% (w/v) or more. A sweetener having such a Brix and such a glucose concentration has the rich sweet taste and umami taste inherent in mirin with suppressed microbial contamination. Since microbial contamination is further suppressed, and the sweet taste and umami taste become richer, the Brix of the sweetener is preferably 45% or more, and the glucose concentration is preferably 15% (w/v) or more. Furthermore, from the viewpoint of obtaining satisfactory pressing characteristics and obtaining a moderate sweet taste, the sweetener may have a Brix of 60% or less and may have a glucose concentration of 70% (w/v) or less. Here, the Brix can be measured by using, for example, a saccharimeter (manufactured by ATAGO CO., LTD., RX-5000a), and the glucose concentration can be measured by, for example, a known method such as a colorimetric method based on an enzymatic reaction.

The amino acid concentration of the sweetener obtained through the solid-liquid separation step may be 0.05% (w/v) or more or 0.1% (w/v) or more. As a result, the sweetener becomes richer in the umami taste and richness. Furthermore, from the viewpoint of obtaining moderate umami taste and richness, the amino acid concentration of the sweetener may be 2.5% (w/v) or less or 2.0% (w/v) or less. Here, the amino acid concentration can be measured by, for example, a known method such as an analytical method using HPLC.

The citric acid concentration of the sweetener obtained through the solid-liquid separation step may be 0.1% (w/v) or more or 0.2% (w/v) or more. When the citric acid concentration is in the above-described range, the sweetener acquires a moderate acid taste, and the pH can be adjusted to weak acidity without adding an acidulant. For example, the citric acid concentration can be set in the above-described range by using white koji in the above-described decomposition step. Furthermore, from the viewpoint of obtaining a moderate acid taste, the citric acid concentration of the sweetener may be 0.5% (w/v) or less or 0.4% (w/v) or less. Here, the citric acid concentration can be measured by, for example, a known method such as an analytical method using HPLC.

(5) Concentration Step

The manufacturing method for a sweetener according to the present embodiment may further include a step of concentrating the liquid obtained in the solid-liquid separation step, under reduced pressure (concentration step). As a result, the obtained sweetener has richer sweet taste and umami taste and has a more mellow aroma.

The method for concentration in the concentration step is not particularly limited and can be carried out by a conventional method, and for example, concentration under reduced pressure by a centrifugal type thin film vacuum evaporator (for example, EVAPOR (manufactured by OKAWARA MFG. CO., LTD.)) may be mentioned.

The sweetener obtained through the concentration step may have a Brix of 55% or more and may have a glucose concentration of 20% (w/v) or more. A sweetener having such a Brix and such a glucose concentration has microbial contamination further suppressed and has richer sweet taste and umami taste. From the viewpoint that microbial contamination is even more suppressed, and the sweet taste and umami taste become even richer, the Brix of the sweetener is preferably 60% or more, and the glucose concentration is preferably 25% (w/v) or more.

The amino acid concentration of the sweetener obtained through the concentration step may be 0.1% (w/v) or more or 0.15% (w/v) or more. As a result, the umami taste of the sweetener is even richer. Furthermore, from the viewpoint of having moderate umami taste and richness, the amino acid concentration of the sweetener may be 3.0% (w/v) or less or 2.5% (w/v) or less.

The glutamic acid concentration of the sweetener obtained through the concentration step may be 0.03% (w/v) or more or 0.04% (w/v) or more. Furthermore, the alanine concentration of the sweetener may be 0.025% (w/v) or more or 0.035% (w/v) or more. In addition, the arginine concentration of the sweetener may be 0.085% (w/v) or more or 0.095% (w/v) or more. As a result, the umami taste of the sweetener becomes even richer. Here, the concentration of each amino acid can be measured by, for example, a known method such as an analytical method using HPLC.

The viscosity of the sweetener obtained through the concentration step may be 50 cP or more or 100 cP or more at 30° C. A sweetener having a viscosity in this range has moderate viscousness and can be used in a wide range of use applications. Furthermore, from the viewpoint of convenient use, the viscosity of the sweetener may be 20000 cP or less at 30° C. Here, the viscosity can be measured by, for example, using a viscometer (for example, TVB-10M meter).

The pH of the sweetener obtained by the manufacturing method according to the present embodiment may be 3.5 or higher or 4.0 or higher and may be 5.5 or lower or 5.0 or lower. Furthermore, the alcohol concentration of the sweetener obtained by the manufacturing method according to the present embodiment may be 1% (v/v) or less, 0.5% (v/v) or less, 0.05% (v/v) or less, or 0% (v/v).

As described above, the sweetener obtained by the manufacturing method according to the present embodiment has a clear appearance; and, the turbidity thereof is preferably 40 degrees or less, and more preferably 30 degrees or less. Incidentally, when the turbidity is 50 degrees or less, it can be said that the sweetener has a clear appearance. Here, with regard to the "turbidity" according to the present specification, the degree of turbidity of a kaolin standard solution prepared by adding 1 mg of standard kaolin into 1 L of purified water is defined as "1 degree", according to "9. Turbidity" of JIS K0101 "Testing Methods for Industrial Water". The turbidity can be measured by, for example, using a turbidimeter (for example, UT-21 (manufactured by Hitachi High-Tech Science Corporation)).

The sweetener obtained by the manufacturing method according to the present embodiment can be suitably used as a non-alcohol type mirin-like seasoning. The sweetener can be used by blending the sweetener with any food or drink, and for example, the sweetener can also be used for adding into soy sauce, miso paste, broth, gravy, soup, sauce, and dressing; cooking such as boiling down in soy sauce, grilling, and stir-frying; use applications of adding into yogurt, ice cream, and the like; and use applications of applying to toast, vegetable side dishes, and the like (post-coating cooking).

EXAMPLES

Hereinafter, the present invention will be described more specifically by way of Examples. However, the present invention is not intended to be limited to the following Examples.

Example 1: Production of Sweetener (1)

(Saccharification of Rice Raw Material)

Rice raw material, warm water in the same amount as the rice raw material, and a liquefied enzyme (α-amylase) in an amount equivalent to $\frac{1}{3300}$ of the weight of the rice raw material were put into a mixing tank, and the materials were mixed. Next, the mixed liquid was put into a ROTATHERM (registered trademark; manufactured by Gold Peg International Pty., Ltd.) through a loading port, and a saccharification reaction was performed. The saccharification reaction time was set to 1.5 minutes, and the reaction was performed while blowing steam such that the temperature inside the reactor was 110° C. Incidentally, a saccharified liquid obtained by the above-described saccharification reaction was designated as Comparative Example 1-1.

(Decomposition of Saccharified Liquid and Rice Koji)

The saccharified liquid obtained by the above-described saccharification reaction, water, rice koji A (yellow koji; produced by a conventional method) or B (yellow koji; manufactured by KOHSEI FOODS CO., LTD.), α-amylase, and cellulase were put into an oblique axis cooker/mixer (manufactured by KAJIWARA, INC.) so as to obtain the composition of Table 1. In addition, rice koji C (white koji; manufactured by KOHSEI FOODS CO., LTD.) or lactic acid was put into the mixture. The mixture was subjected to decomposition at 65° C. for 18 hours while being stirred at 20 rpm.

filtrates obtained in Examples 1-1 and 1-2 had a clear appearance when visually inspected.

(General Component Analysis)

The glucose concentration, the amino acid concentration, the Brix, and the turbidity of Comparative Example 1-1 (saccharified liquid), Comparative Example 1-2 (general, commercially available amazake), and the filtrates obtained in Examples 1-1 and 1-2 were measured. Regarding the glucose concentration, measurement was carried out according to a standard method by using a commercially available glucose measurement kit (manufactured by FUJIFILM Wako Pure Chemical Corporation). Regarding the amino acid concentration, measurement was carried out according to a standard method using HPLC. Regarding the Brix, measurement was carried out by using a saccharimeter (manufactured by ATAGO CO., LTD., RX-5000x). The turbidity was measured by using a turbidimeter UT-21 (manufactured by Hitachi High-Tech Science Corporation). The results are shown in Table 2.

TABLE 2

| | Glucose concentration (%) | Amino acid concentration (%) | Brix (%) | Turbidity (degrees) |
|---|---|---|---|---|
| Comparative Example 1-1 (saccharified liquid) | 1.07 | 0.08 | 41.3 | — |
| Comparative Example 1-2 (amazake) | 13.4 | 0.12 | 17.8 | — |
| Example 1-1 | 22.3 | 0.47 | 50.9 | 3.40 |
| Example 1-2 | 50.9 | 0.85 | 57.8 | 4.54 |

(Aroma Component Analysis)

Characteristic aroma components of the filtrates obtained in Examples 1-1 and 1-2 and a commercially available general amazake (Comparative Example 1-2) were extracted. Regarding the analysis of the aroma components, analysis was carried out according to a standard method by using a gas chromatogram 7890GC (manufactured by Agilent Technologies, Inc.) and a mass spectrometer 5977MSD (manufactured by Agilent Technologies, Inc.). Next, the peak area ratios of methionol and 3-methylbutanol of Examples 1-1 and 1-2 with respect to Comparative Example 1-2 were calculated. Furthermore, quantitative analysis of methional and furfural was carried out according to standard methods. The results are shown in Table 3.

TABLE 1

| | Saccharified liquid | Water | Rice koji A | Rice koji B | Rice koji C | α-Amylase | Cellulase | Lactic acid |
|---|---|---|---|---|---|---|---|---|
| Example 1-1 | 156 kg | 5.6 kg | — | 13.6 kg | 4.8 kg | 0.18 kg | 0.18 kg | — |
| Example 1-2 | 100 kg | 10 kg | 40 kg | — | — | 0.75 kg | 0.15 kg | 167 mL |

(Heat Treatment of Decomposed Fermenting Mash)

The decomposed fermenting mash thus obtained was introduced into a tube type heat exchanger (manufactured by IZUMI FOOD MACHINERY Co., Ltd.), and a heat treatment was performed while holding the decomposed fermenting mash for 15 seconds at 115° C.

(Solid-Liquid Separation of Fermenting Mash after Heat Treatment)

The fermenting mash after the heat treatment was introduced into a filter press (manufactured by Yabuta Kikai Co., Ltd.), pressing was performed according to a standard method, and a filtrate (sweetener) was obtained. Both the It was found that the filtrates of Examples 1-1 and 1-2 have remarkably large contents of methionol, 3-methylbutanol, methional, and furfural as compared with the commercially available amazake. Methionol is one of representative aroma components constituting soy sauce, and it has been reported that methionol has an effect of enhancing a salty taste and an effect of weakening the fishy smell of meat and fish. 3-Methylbutanol has a rum-like or whiskey-like aroma, and it has been reported that 3-methylbutanol has an effect of masking the animal odor of meat. Methional is one of representative aroma components constituting soy sauce, and it has been reported that methional is involved in the depth, fragrance, and persistence of the flavor of fermented products. Furthermore, it has been reported that furfural imparts a sweet and fragrant aroma. Therefore, the sweeteners of Examples 1-1 and 1-2 containing large quantities of these components are considered to be more suitable as seasonings.

TABLE 3

|  | Methionol | 3-Methylbutanol | Methional | Furfural |
|---|---|---|---|---|
| Comparative example 1-2 (amazake) | 1 | 1 | 16 ppb | 0.02 ppm |
| Example 1-1 | 72.9 | 71.1 | 86 ppb | 0.56 ppm |
| Example 1-2 | 131 | 92.3 | 424 ppb | 1.41 ppm |

(Inoculation Test for Lactic Acid Bacteria)

*Lactobacillus fructivorans* (*L. fructivorans*) is known as a bacterium which proliferates and causes harm during the production process for sake, mirin, and the like. Thus, the proliferation characteristics of *L. fructivorans* in the saccharified liquid of Comparative Example 1-1, the amazake of Comparative Example 1-2, and the filtrates of Examples 1-1 and 1-2 were checked. Preculture of *L. fructivorans* was carried out in advance in an MRS liquid medium, the bacterial cells were added to each sample at a concentration of $3.0 \times 10^5$ cells/mL, and the numbers of bacterial cells after static culture at 30° C. for 24 hours and after static culture for 48 hours at 30° C. were measured. The number of bacterial cells was measured by using an MRS agar medium (manufactured by Becton, Dickinson and Company). The results are shown in Table 4.

In the commercially available amazake and the saccharified liquid, the bacterial cells proliferated 10 or more times after 24 hours from the initiation of inoculation, whereas in the filtrates of Examples 1-1 and 1-2, the bacterial cells did not proliferate even after 48 hours. Since the pH and water activity are lower in comparison with the existing manufacturing methods for amazake and the like, it was recognized that the risk of contamination during the production process is also reduced.

TABLE 4

|  | Water activity | pH | Number of bacterial cells after 0 hours (cfu/mL) | Number of bacterial cells after 24 hours (cfu/mL) | Number of bacterial cells after 48 hours (cfu/mL) |
|---|---|---|---|---|---|
| Comparative Example 1-1 (saccharified liquid) | 0.96 | 5.3 | $3.6 \times 10^5$ | $1.1 \times 10^8$ | $1.4 \times 10^8$ |
| Comparative Example 1-2 (amazake) | 0.97 | 6.3 | $4.7 \times 10^5$ | $6.3 \times 10^7$ | $8.3 \times 10^7$ |
| Example 1-1 | 0.91 | 4.9 | $3.6 \times 10^5$ | $4.0 \times 10^5$ | $3.9 \times 10^5$ |
| Example 1-2 | 0.87 | 4.9 | $2.8 \times 10^5$ | $1.4 \times 10^5$ | $7.9 \times 10^4$ |

(Analysis of Various Organic Acids)

The concentrations of various organic acids contained in the filtrates obtained in Examples 1-1 and 1-2 were measured. The concentration of each organic acid was measured according to a standard method using HPLC. The results are shown in Table 5. Incidentally, the unit in the table is % (w/v) in all cases.

The filtrate of Example 1-1 obtained by using rice koji C (white koji) contained a larger amount of citric acid, and it was verified that the pH can be controlled without adding an acidulant such as lactic acid.

TABLE 5

|  | Citric acid | Lactic acid |
|---|---|---|
| Example 1-1 | 0.152 | — |
| Example 1-2 | 0.033 | 0.147 |

(Cooking Test Using Fermenting Mash and Filtrate)

A cooking test for freeze-dried tofu was performed by using the fermenting mash after heat treatment and the filtrate (sweetener) after pressing, which were produced in Example 1-1. First, 40 mL of the fermenting mash or the filtrate, 5 mL of light-colored soy sauce (manufactured by Kikkoman Corporation), 1.5 g of table salt, 2 g of blend stock granules (manufactured by Ajinomoto Co., Inc.), and 290 mL of water were poured in a pot, and the mixture was heated over medium heat. Thereafter, commercially available freeze-dried tofu that had been restored with hot water and cut into bite-sized pieces was put into the pot, and the mixture was heated over medium heat for 12 minutes. A sensory evaluation was conducted by four evaluators who were trained to have a discrimination ability, and the taste and appearance were evaluated. The results are shown in Table 6.

The freeze-dried tofu cooked using the fermenting mash had a cloudy appearance of broth, resulting in a poor visual impression of the appearance. On the other hand, the freeze-dried tofu cooked using the clear filtrate after pressing had a favorable appearance of broth and gave a feeling of umami taste and the like, resulting a well-balanced taste. Furthermore, four out of the four evaluators answered that the filtrate is suitable for use in cooking. From these results, the sweetener obtained by the manufacturing method of the present invention has high general-purpose usability and can be used for various dishes. Furthermore, since the sweetener contained not only sugars such as glucose but also large quantities of amino acids, it resulted that the sweetener gave not only a sweet taste but also an umami taste.

TABLE 6

|  | Number of evaluators who considered preferable | Remarks |
|---|---|---|
| Fermenting mash of Example 1-1 | 0 persons | Broth of freeze-dried tofu is cloudy, and appearance is poor. |
| Filtrate of Example 1-1 | 4 persons | Broth of freeze-dried tofu is clear, and appearance is favorable. Not only sweet taste but also umami taste is felt, and balance of taste is favorable. |

Example 2: Verification of Production of Lees by Heat Treatment (Saccharification of Rice Raw Material)

A mixed liquid of a rice raw material, warm water in the same amount as the rice raw material, and a liquefied enzyme ("-amylase) in an amount equivalent to ⅓₃₀₀ of the weight of the rice raw material were put into a ROTA-THERM (manufactured by Gold Peg International Pty., Ltd.), and a saccharification reaction was performed, in the same manner as in Example 1.

(Decomposition of Saccharified Liquid and Rice Koji)

The saccharified liquid obtained by the above-described saccharification reaction, water, rice koji B (yellow koji;

manufactured by KOHSEI FOODS CO., LTD.), rice koji C (white koji; manufactured by KOHSEI FOODS CO., LTD.), α-amylase, and cellulase were put into a jar fermenter (manufactured by Marubishi Bioengineering Co., Ltd.) so as to obtain the composition of Table 7, and the mixture was subjected to decomposition at 75° C. for 1 hour and at 65° C. for 18 hours while being stirred at 150 rpm.

TABLE 7

| Saccharified liquid | Water | Rice koji B | Rice koji C | α-Amylase | Cellulase |
|---|---|---|---|---|---|
| 17.5 kg | 0.65 kg | 1.5 kg | 0.6 kg | 0.02 kg | 0.02 kg |

(Heat Treatment of Decomposed Fermenting Mash and Solid-Liquid Separation)

The decomposed fermenting mash thus obtained was introduced into a tube type heat exchanger (manufactured by IZUMI FOOD MACHINERY Co., Ltd.), and a heat treatment was carried out while holding the fermenting mash at 115° C. for 15 seconds. The fermenting mash after the heat treatment was introduced into a filter press (manufactured by NSK Engineering Co., Ltd.), pressing was performed according to a standard method, and a filtrate was obtained (Example 2). Besides, solid-liquid separation was first carried out by a similar method, subsequently a heat treatment was performed to investigate whether lees produced by heating would be produced in the filtrate (Comparative Example 2).

Production of lees was checked by visual inspection, and it was found that the filtrate of Example 2 was clear, while lees were produced by heating in the filtrate of Comparative Example 2, causing the filtrate to become cloudy. Furthermore, the turbidities of the filtrates of Comparative Example 2 and Example 2 were measured in the same manner as in Example 1, and the turbidity was 13.0 degrees in Example 2, while the turbidity was 93.1 degrees in Comparative Example 2, so that it was found that the filtrate of Example 2 was much clearer than that of Comparative Example 2. From these results, it was verified that the lees produced by heating can be removed in the solid-liquid separation step by performing a heat treatment before the solid-liquid separation step, and a subsequent step for removing lees is unnecessary.

Example 3: Production of Sweetener (2)

Saccharification of a rice raw material, decomposition of a saccharified liquid and rice koji, and heat sterilization and pressing of a fermenting mash were carried out in the same manner as in Example 1-1, and a filtrate was obtained. Next, the obtained filtrate was introduced into a centrifugal type thin film vacuum evaporator, EVAPOR (manufactured by OKAWARA MFG. CO., LTD.), concentration was performed according to a standard method until the Brix reached near 70, 75, and 80, and concentrated liquids of Examples 3-1, 3-2, and 3-3 were each obtained.

For the concentrated liquids of Examples 3-1, 3-2, and 3-3, the glucose concentration, the amino acid concentration, the Brix, turbidity, and viscosity were measured in the same manner as in Example 1. The viscosity was measured at 30° C. according to a standard method by using a viscometer (TVB-10M meter). The results are shown in Table 8 together with the measurement results for the filtrate of Example 1-1.

By performing concentration, the sugar concentration and the amino acid concentration of the solution were increased, and moderate viciousness could be imparted.

(Analysis of Various Amino Acids)

The concentrations of various amino acids contained in the concentrated liquid of Example 3-1 were measured. The concentration of each amino acid was measured according to a standard method using HPLC. The results are shown in Table 9 together with the measurement results for the amazake of Comparative Example 1-2. Incidentally, the unit in the table is % (w/v) in all cases.

It was verified that the concentrated liquid of Example 3-1 contained all of glutamic acid, alanine, and arginine in large amounts as compared with the amazake of Comparative Example 1-2.

(Sensory Evaluation of Intensity of Umami Taste)

A sensory evaluation of the intensity of umami taste was conducted for the amazake of Comparative Example 1-2 and a sweetener obtained by adding amino acids to the amazake of Comparative Example 1-2 such that the glutamic acid concentration was 0.3 mg/ml, the alanine concentration was 0.25 mg/ml, and the arginine concentration was 0.85 mg/ml. The sensory evaluation of the intensity of umami taste was conducted by six evaluators who were trained to have a discrimination ability, the results were digitized by using five-grade criteria (2: strong, 1: slightly strong, 0: same, −1: slightly weak, −2: weak), with the umami taste of the amazake of Comparative Example 1-2 taken as the reference (0), and the average values and the standard errors were calculated. As a result, it was verified that the intensity of umami taste of the sweetener obtained by adding each amino acid to the amazake of Comparative Example 1-2 significantly increased to 1.17±0.37.

(Cooking Test)

A cooking test was performed by using the concentrated liquid of Example 3-1. Specifically, the concentrated liquid of Example 3-1 was used for boiled spinach. Furthermore, as comparative examples, commercially available original mirin (containing alcohol) (manufactured by Kikkoman Corporation) or a commercially available mirin-like seasoning (non-alcoholic type) (manufactured by Kikkoman Corporation) was used for boiled spinach in the same amount as the concentrated liquid of Example 3-1. A sensory evaluation was conducted by four evaluators who were trained to have a discrimination ability, and the taste and odor were evaluated. The results are shown in Table 10.

It was verified that the boiled spinach for which the concentrated liquid of Example 3-1 was used had excellent taste and flavor as compared with the boiled spinach for which the commercially available original mirin or mirin-like seasoning were used. Therefore, the sweetener of the present invention can be used even for post-coating cooking.

TABLE 8

| | Glucose concentration (%) | Amino acid concentration (%) | Brix (%) | Turbidity (degrees) | Viscosity (cP) |
|---|---|---|---|---|---|
| Example 1-1 | 22.3 | 0.47 | 50.9 | 3.40 | 13 |
| Example 3-1 | 36.6 | 0.71 | 69.8 | 4.64 | 116 |
| Example 3-2 | 38.2 | 0.79 | 75.2 | 5.02 | 1100 |
| Example 3-3 | 42.1 | 0.87 | 82.8 | 5.42 | 9980 |

TABLE 9

| | Glutamic acid | Alanine | Arginine |
|---|---|---|---|
| Comparative Example 1-2 (amazake) | 0.016 | 0.012 | 0.018 |
| Example 3-1 | 0.056 | 0.047 | 0.103 |

TABLE 10

| | Number of evaluators who considered preferable | Remarks |
|---|---|---|
| Example 3-1 | 6 persons | Has richness, umami taste, and mild sweet taste. |
| Original mirin | 0 persons | Has alcoholic odor. |
| Mirin-like seasoning | 1 person | Has acid taste. |

(Inoculation Test for Lactic Acid Bacteria)

The proliferation characteristics of *L. fructivorans* in the filtrate of Example 1-1 and the concentrated liquids of Examples 3-1 and 3-2 were checked. Preculture of *L. fructivorans* was carried out in advance in an MRS liquid medium, the bacterial cells were added to each sample at a concentration of $1.0 \times 10^5$ cells/mL, and the numbers of bacterial cells after static culture for 2 days and for 5 days at 30° C. were measured. The measurement of the number of bacterial cells was carried out by using an MRS agar medium (manufactured by Becton, Dickinson and Company). The results are shown in Table 11.

In the filtrate of Example 1-1, proliferation of bacterial cells was hardly observed after 5 days. In contrast to this, in the concentrated liquids of Examples 3-1 and 3-2, the number of bacterial cells was markedly reduced after 5 days. From the results given above, it was verified that the risk of microbial contamination can be further reduced by performing concentration.

TABLE 11

| | Water activity | pH | Number of bacterial cells after 0 hours (cfu/mL) | Number of bacterial cells after 2 days (cfu/mL) | Number of bacterial cells after 5 days (cfu/mL) |
|---|---|---|---|---|---|
| Example 1-1 (unconcentrated) | 0.91 | 4.9 | $1.6 \times 10^5$ | $1.4 \times 10^5$ | $4.0 \times 10^5$ |
| Example 3-1 (concentrated) | 0.81 | 4.8 | $5.1 \times 10^4$ | $4.4 \times 10^4$ | $3.6 \times 10^2$ |
| Example 3-2 (concentrated) | 0.74 | 4.8 | $10.4 \times 10^5$ | $5.6 \times 10^4$ | $5.2 \times 10^2$ |

The invention claimed is:

1. A manufacturing method for a sweetener, the manufacturing method comprising:

a saccharification step of injecting steam at a temperature of 90° C. or higher and 150° C. or lower into a mixture of water, rice flour, and an enzyme agent to cause the mixture to react and obtaining a saccharified liquid;

a decomposition step of adding rice koji to the saccharified liquid and causing the mixture of the rice koji and the saccharified liquid to react at a temperature of 50° C. or higher and 80° C. or lower to obtain a fermenting mash;

a heat treatment step of heating the fermenting mash at a temperature of 100° C. or higher; and a solid-liquid separation step of subjecting the heat-treated fermenting mash to solid-liquid separation.

2. The manufacturing method according to claim 1, wherein the sweetener has a Brix of 40% or more and a glucose concentration of 10% (w/v) or more.

3. The manufacturing method according to claim 1, wherein the sweetener has a pH of 5.5 or lower and a turbidity of 50 degrees or less.

4. The manufacturing method according to claim 1, wherein the sweetener has a citric acid concentration of 0.1% (w/v) or more.

5. A sweetener manufactured by the manufacturing method according to claim 1, wherein the sweetener has a Brix of 45% or more, a glucose concentration of 15% (w/v) or more, an amino acid concentration of 0.05% (w/v) or more, and a citric acid concentration of 0.1% (w/v) or more.

6. The manufacturing method according to claim 1, further comprising a concentration step of concentrating a liquid obtained in the solid-liquid separation step, under reduced pressure.

7. The manufacturing method according to claim 6, wherein the sweetener has a Brix of 55% or more and a glucose concentration of 20% (w/v) or more.

8. The manufacturing method according to claim 6, wherein the sweetener has a turbidity of 50 degrees or less.

9. The manufacturing method according to claim 6, wherein the sweetener has a glutamic acid concentration of 0.03% (w/v) or more, an alanine concentration of 0.025% (w/v) or more, and an arginine concentration of 0.085% (w/v) or more.

10. The sweetener according to claim 5, wherein the sweetener has a pH of 5.0 or lower.

* * * * *